United States Patent
Zargari et al.

(10) Patent No.: US 7,495,410 B2
(45) Date of Patent: Feb. 24, 2009

(54) SYSTEMS AND METHODS FOR IMPROVED MOTOR DRIVE POWER FACTOR CONTROL

(75) Inventors: Navid Reza Zargari, Cambridge (CA); Jason Cornelius Wiseman, Guelph (CA); Yuan Xiao, Kitchener (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 205 days.

(21) Appl. No.: 11/668,851

(22) Filed: Jan. 30, 2007

(65) Prior Publication Data

US 2008/0180055 A1 Jul. 31, 2008

(51) Int. Cl.
*H02P 1/24* (2006.01)

(52) U.S. Cl. .................. 318/729; 318/438; 318/800; 318/801; 363/34; 363/37; 363/89; 363/97

(58) Field of Classification Search .................. 318/729, 318/438, 800, 801, 825
See application file for complete search history.

(56) References Cited

U.S. PATENT DOCUMENTS

| | | | | |
|---|---|---|---|---|
| 4,293,905 A | * | 10/1981 | Opal | ................ 363/124 |
| 5,136,494 A | * | 8/1992 | Akagi et al. | ............... 363/34 |
| 5,373,223 A | * | 12/1994 | Akagi et al. | ................ 318/722 |
| 6,269,010 B1 | | 7/2001 | Ma et al. | |
| 6,366,483 B1 | | 4/2002 | Ma et al. | |
| 6,819,076 B2 | * | 11/2004 | Takahashi | ................ 318/801 |
| 6,822,417 B2 | * | 11/2004 | Kawaji et al. | ............... 318/701 |
| 6,958,589 B2 | * | 10/2005 | Kawaji et al. | ............... 318/802 |
| 7,301,789 B2 | * | 11/2007 | Wiseman | ................ 363/56.12 |
| 2006/0044711 A1 | | 3/2006 | Wiseman | |
| 2006/0133120 A1 | | 6/2006 | Sato et al. | |
| 2007/0216343 A1 | * | 9/2007 | Rozman et al. | ............. 318/811 |

FOREIGN PATENT DOCUMENTS

WO    WO 03/084047 A1    10/2003

OTHER PUBLICATIONS

European Search Report, EP 08 10 0991, Jun. 2, 2008, Munich.

* cited by examiner

*Primary Examiner*—Bentsu Ro
*Assistant Examiner*—Thai Dinh
(74) *Attorney, Agent, or Firm*—Fay Sharpe LLP; Alexander R. Kuszewski (57) ABSTRACT

Systems and methods are described for controlling power factor in motor drives having a switching rectifier providing a DC link current to an inverter in which the rectifier gain is increased to provide additional DC link current to correct the drive power factor based on current drawn by capacitors of the AC drive power input, and the inverter gain is decreased by introducing bypass states in the inverter switching control scheme or by reducing the motor flux to accommodate the increased DC link current.

22 Claims, 5 Drawing Sheets

SYSTEMS AND METHODS FOR IMPROVED MOTOR DRIVE POWER FACTOR CONTROL

FIELD OF THE INVENTION

The present invention relates generally to electrical power conversion, and more particularly to systems and methods for controlling power factor in motor drive systems.

BACKGROUND OF THE INVENTION

Adjustable speed motor drives are power conversion systems that operate to provide power to electric motors in a controlled fashion to control one or more motor performance parameters, such as speed, torque, etc. Medium voltage current-sourced type motor drives typically receive multiphase AC input power in the range of about 2,400 to 6,900 volts, which is converted to DC power referred to as a DC link and provided to an inverter stage. The inverter switches the DC link currents to provide AC output current to a motor load with the output current being controlled by the inverter in closed loop fashion to drive the motor at a desired speed and/or torque. The rectifier is generally an active switching type rectifier that selectively activates switches to provide current from the AC input to the DC link bus to achieve AC to DC power conversion, where the rectifier gain is controlled to provide a DC link current level at the peak current level required by the motor at any given time. The inverter, in turn, implements a switching scheme to selectively connect the motor leads to the DC link bus terminals to provide motor phase currents with controlled amplitudes, phase, and frequency to implement a particular motor control strategy based on motor performance feedback values and desired performance setpoints or profiles. The use of an active front end rectifier in the drive, however, causes a non-unity leading power factor, particularly during startup of the motor because of the filter capacitors associated with the AC input. This is particularly undesirable in situations where the AC input is provided by a generator, where the leading power factor at start up can cause generator instability. Thus, there remains a need for motor drive systems and control techniques by which improved power factor control can be achieved.

SUMMARY OF INVENTION

One or more aspects of the invention are now summarized to facilitate a basic understanding of the invention, wherein this summary is not an extensive overview of the invention, and is intended neither to identify certain elements of the invention, nor to delineate the scope thereof. The primary purpose of the summary, rather, is to present some concepts of the invention in a simplified form prior to the more detailed description that is presented hereinafter. The present invention is related to motor drive systems and methods for controlling and powering electric motors while providing near-unity power factor throughout all or a portion of the motor speed range and finds particular utility in association with variable speed medium voltage current source type motor drives having a switching rectifier providing a DC link current to a current-source inverter. The invention may be employed to mitigate the adverse effects of leading power factor, particularly during startup, by increasing the gain of the switching rectifier so as to provide additional DC link current to compensate for current drawn by capacitors of the AC drive power input, and thereby to provide power factor correction. In addition, the gain of the switching inverter stage is reduced, such as by introducing bypass states in the inverter switching pattern and/or by controlled reduction of the motor flux, so as to accommodate the increased DC link current. The techniques of the present disclosure thus facilitate stable motor drive startup, particularly for generator driven applications, with a low phase angle and high current as opposed the more conventional scheme of starting with low current and large phase angle.

In accordance with one or more aspects of the invention, motor drive systems are provided, which are comprised of a switching rectifier operating according to a first set of switch control signals, an inverter operable by a second set of switch control signals, and a controller that provides the switch control signals. The controller includes motor control and power factor control components that determine a required motor control current value and a required power factor compensation current value, respectively, where the rectifier is operated according to both these values to provide an increased DC link current and to thereby control the motor drive power factor. The inverter provides the output current to the motor based on the required motor control current value and may selectively bypass the excess link current using bypass switching states and/or may reduce the motor flux to thereby utilize the extra current in the motor.

Further aspects of the disclosure relate to a motor drive control system that includes a motor control component which determines a required motor control current value according to motor feedback and a setpoint or profile, and a power factor control component that determines a required power factor compensation current value corresponding to input capacitors associated with an AC input of the rectifier. The control system further comprises a rectifier control component that provides switch control signals to the rectifier according to the required motor control current value and according to the required power factor compensation current value to control the power factor of the motor drive system, as well as an inverter control component providing inverter control signals to provide the AC output based on to the required motor control current.

Still other aspects of the present disclosure are directed to a method for controlling an AC motor, which includes rectifying an AC input to provide a DC link current via a switching rectifier, inverting the DC link current to provide an AC output current to a motor using an inverter, determining a required motor control current value according to motor feedback and a setpoint or profile, and determining a required power factor compensation current value that corresponds to input capacitors of the AC input. The method further provides for controlling the switching rectifier to provide an increased DC link current over at least a portion of the motor speed range based on the required motor control current value and the required power factor compensation current value, and controlling the inverter to provide the AC output according to the required motor control current.

BRIEF DESCRIPTION OF THE DRAWINGS

The following description and drawings set forth certain illustrative implementations of the invention in detail, which are indicative of several exemplary ways in which the principles of the invention may be carried out. The illustrated examples, however, are not exhaustive of the many possible embodiments of the invention. Other objects, advantages and novel features of the invention will become apparent from the following detailed description of the invention when considered in conjunction with the drawings, in which.

DETAILED DESCRIPTION OF THE INVENTION

Figure 1:
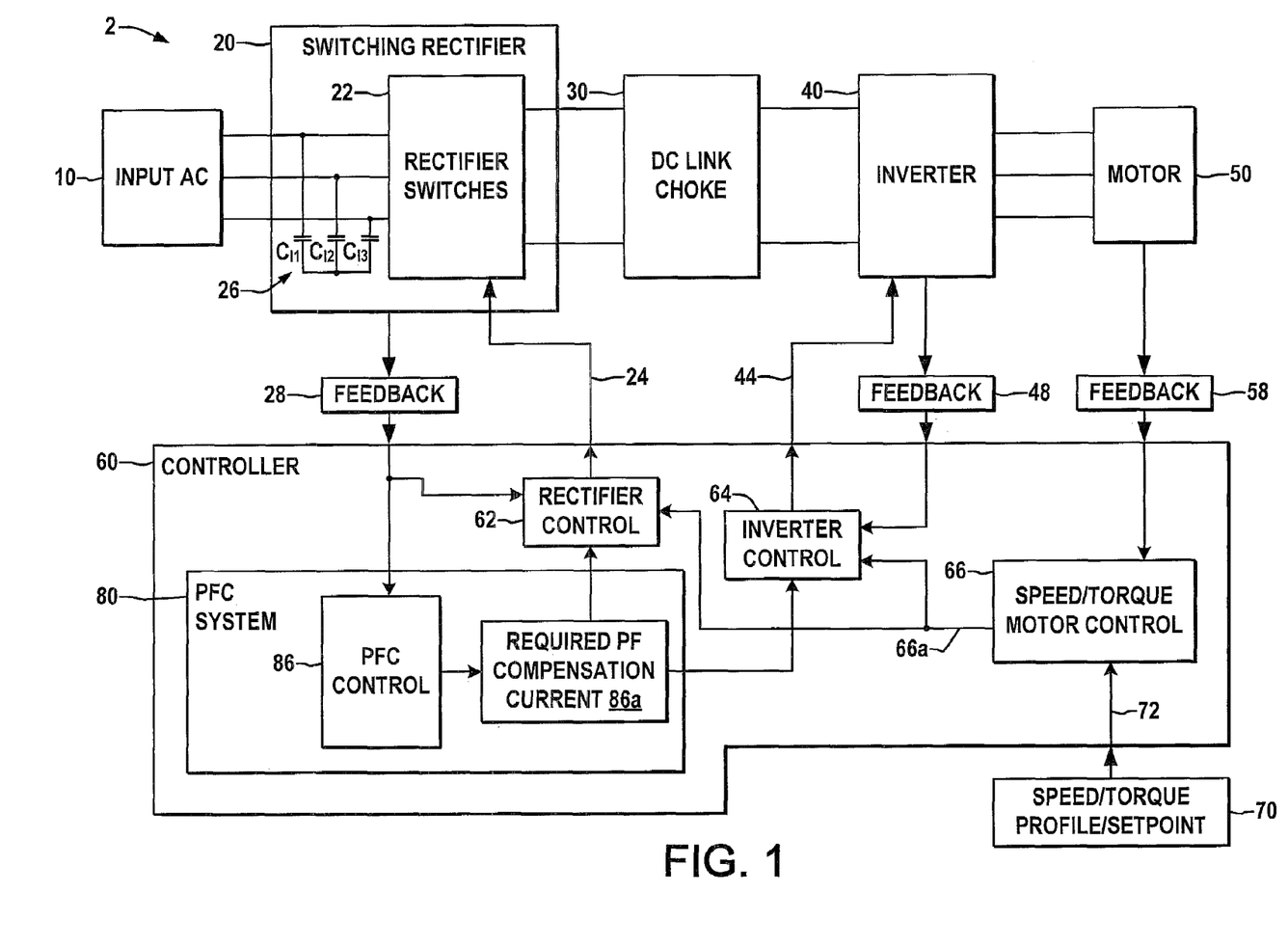
FIG. 1 is a schematic diagram illustrating a medium voltage current source motor drive with an exemplary drive control system providing power factor correction in accordance with one or more aspects of the present disclosure.
Figure 2:
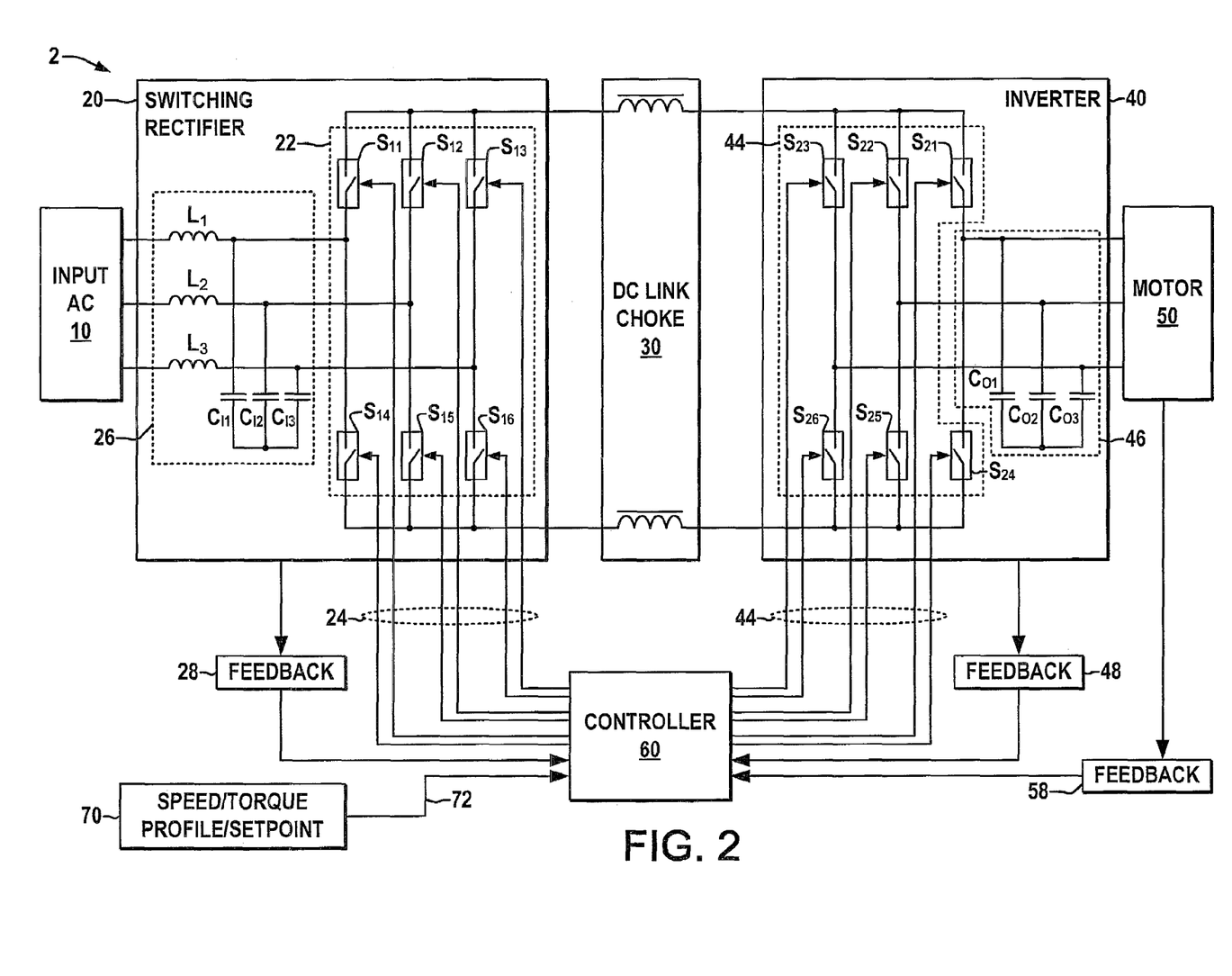
FIG. 2 is a schematic diagram illustrating further details of the switching rectifier and switching inverter in the motor drive system of FIG. 1.
Figure 3:
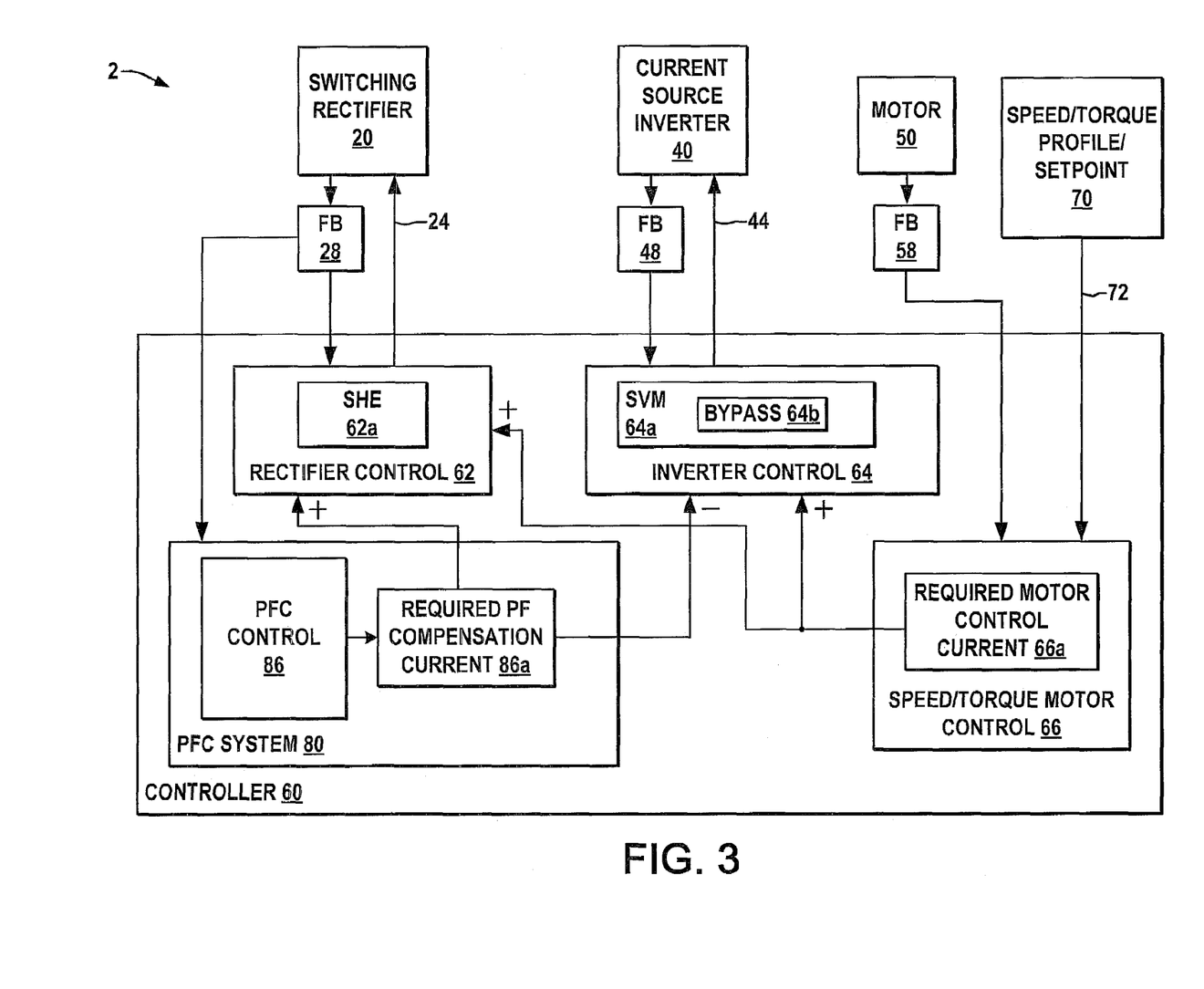
FIG. 3 is a schematic diagram illustrating further details of the control system in the motor drive of FIG. 1.

Referring now to the figures, several embodiments or implementations of the present invention are hereinafter described in conjunction with the drawings, wherein like reference numerals are used to refer to like elements throughout, FIGS. 1-3 illustrate a medium voltage current source motor drive system 2 in accordance with the present disclosure, which receives AC input power from a power supply 10 and provides variable frequency AC power to a motor load 50. The drive 2 includes a switching rectifier 20 with input filter capacitors 26 and a set of rectifier switches 22 operable according to a first set of switch control signals 24 from a controller 60 to provide DC link current to an intermediate DC bus or link having a DC link choke or inductor 30. The DC link current is provided via the link choke 30 to a current source type switching inverter 40 that selectively switches the DC current according to a second set of switch control signals 44 from the controller 60 to power the motor load 50.

As best shown in FIG. 2, the rectifier 20 includes a first set of switching devices 22 $S_{11}$, $S_{12}$, $S_{13}$, $S_{14}$, $S_{15}$, and $S_{16}$, which may be any suitable type of semiconductor-based switching devices such as gate-turnoff thyristors (GTOs), insulated-gate bipolar transistors (IGBTs), etc. In the illustrated example, six switching devices 22 are shown, with three upper switches $S_{11}$, $S_{12}$, and $S_{13}$ connected between input filter inductors $L_1$, $L_2$ and $L_3$ and an upper DC bus terminal of the link choke 30, as well as three lower switches $S_{14}$, $S_{15}$, and $S_{16}$ coupled between the inductors $L_1$, $L_2$, and $L_3$ and a lower DC link choke terminal. Alternative embodiments are possible in which any suitable number of switching devices are provided in the first set 22, such as where multiple switches are provided in each of the six circuit branches, or wherein fewer or more phases are provided, with corresponding switching devices 22 being provided to selectively connect the individual input lines with the DC link bus terminals.

In operation, the first set of switches 22 are selectively actuated through one or more pulse width modulation (PWM) techniques according to corresponding signals 24 from the controller 60 to couple the AC input connections with one or the other of the DC bus terminals of the link choke 30, where the timing of the device switching determines the power conversion performance of the rectifier 20 in providing the DC link current. In one exemplary implementation, the rectifier 20 is controlled using selective harmonic elimination (SHE) although any suitable switching technique can be used. The AC input 10 in the illustrated implementation is three-phase, wherein the rectifier 20 includes input filtering components 26 including input capacitors $C_{f1}$, $C_{f2}$, and $C_{f3}$ connected in line-to-neutral fashion as well as in-line phase inductors $L_1$, $L_2$, and $L_3$. Alternate embodiments are possible in which the filter capacitors $C_{f1}$, $C_{f2}$, and $C_{f3}$ can be connected in a line-to-line configuration, where additional filter components 26 are provided at the rectifier input (e.g., line-to-neutral and line-to-line capacitors, etc.), where the phase inductors $L_1$, $L_2$, and $L_3$ may be omitted, and/or where the input 10 is single phase or any number of phases, wherein the present invention is not limited to the illustrated three-phase configuration.

The inventors have appreciated that the presence of the input filter capacitance $C_{f1}$, $C_{f2}$, and $C_{f3}$ causes leading power factor at start up which can lead to instability in generators providing the AC input 10 absent countermeasures for power factor correction provided by the exemplary controller 60 as further illustrated and described below. In this regard, the exemplary control system 60 operates the rectifier 20 at a gain such that the DC link current level exceeds the peak current requirement of the motor load 50 and any output filter capacitors 46 with the additional DC link current amount being determined according to the amount of input current needed to correct the drive power factor to compensate for the current drawn by the input capacitances $C_{f1}$, $C_{f2}$, and $C_{f3}$, referred to herein as a required power factor compensation current value. This enhanced or increased DC link current is then provided from the link choke 30 as an input to a second set of switching devices 44 of the current source switching inverter 40.

The exemplary inverter 40 includes a second set of switching devices 44, which may be any type or form of electrical switches, including without limitation those mentioned above in connection with the rectifier switches 22, wherein the illustrated implementation provides three upper switches $S_{21}$, $S_{22}$, and $S_{23}$ connected between the upper output terminal of the choke 30 and the corresponding motor leads, and three lower switches $S_{24}$, $S_{25}$, and $S_{26}$ coupled between the motor leads and a lower DC link choke output terminal. As with the first switch set 22 of the rectifier 20, the second set 44 in the inverter 40 may include different numbers of switches and different configurations thereof, wherein the present disclosure is not limited to the illustrated example of FIG. 2. In addition, the inverter 40 and/or the motor load 50 itself may provide output capacitors 46, in this example, line-to-neutral connected output capacitors $C_{O1}$, $C_{O2}$, and $C_{O3}$, wherein the controller 60 operates the inverter switches 44 using one or more forms of pulse-width-modulation, such as space vector modulation (SVM), selective harmonic elimination (SHE), or combinations thereof in certain suitable embodiments. In the exemplary implementation, the controller 60 employs space vector modulation for lower speeds with SHE being used in an upper speed range for pulse width modulation control of the second set of switches 44 in the inverter 40.

FIGS. 1 and 3 schematically illustrate one possible implementation of the exemplary controller 60, which includes various functional components described hereinafter, each of which may be implemented in hardware, software, firmware, logic, etc., or combinations thereof, and some of which may be integrated with one another, wherein all such alternate implementations are contemplated as falling within the scope of the present disclosure. The motor drive control system 60 provides the first and second sets of switch control signals 24 and 44 to the rectifier 20 and inverter 40, respectively, and operates in closed loop fashion using feedback information 28, 48, and 58 from the rectifier 20, inverter 40, and motor 50, respectively, to control the motor operation according to one or more setpoints or desired performance profiles 70 provided as an input 72. The controller 60 may employ any suitable form of closed or open loop control of the various power conversion components 20, 40, which may include multiple control loops so as to regulate the speed and/or torque of the motor 50 at or near a desired operating point 70 such as one or more setpoint values or a series of such values forming a profile (e.g., a speed profile during motor startup, etc.), which operating point 70 is provided as an input 72 to the controller 60. In medium voltage motor drive applications, moreover, the controlled switch activations in the inverter 40 provide variable frequency, variable amplitude, multi-phase AC output power from the DC link to the motor windings to control one or more motor operating parameters (e.g., speed, torque, angle, etc.) across wide ranges.

The feedback information 28 from the switching rectifier 20 may include line voltage, current, frequency, phase or other information related to the AC power provided by the input 10 to facilitate power factor correction (PFC) type control in the drive 2 to mitigate the above mentioned undesirable effects of extreme leading or other non-unity power factor, particularly for generator operated applications at low motor speeds (e.g., during motor startup, etc.). In this respect, the rectifier 20 is preferably operated at an increased gain to provide additional DC link current in a manner that compensates for current used by the input filter capacitors $C_{I1}$, $C_{I2}$, and $C_{I3}$, so as to facilitate equalization of the apparent power delivered to the drive 2 with the real power that the drive 2 consumes to thereby minimize the cost of providing power to the drive 2 and to avoid generator instability. In addition, the rectifier feedback 28 may include values indicating the current and/or voltage levels associated with the DC link output of the rectifier 22 by which the DC link current can be regulated by the controller 60 in closed loop fashion via the first set of switch control signals 24. The controller 60 also receives feedback information 48 from the switching inverter 40, which may include without limitation voltage, current, frequency, phase or other information related to the AC output power provided to the motor 50 so the controller 60 can provide the inverter switch control signals 44 to regulate the operation of the motor 50 in a controlled fashion. The controller 60, moreover, may receive feedback information 58 from the motor load 50 itself or sensors, transducers, etc. associated therewith, for example, motor winding temperatures, voltages, currents, rotor speed values, motor flux values or any other information related to the motor or the current operating condition thereof.

In general, the exemplary control system 60 provides the first and second switching control signal sets 24 and 44 to control which of the switches in the rectifier 20 and inverter 40 are on (e.g., conducting) at any time and what the gating patterns should be, wherein the switching signals 24 to the rectifier are preferable synchronized with the line frequency of the AC input 10. The controller 60 includes a rectifier control component 62, an inverter control component 64, a motor control component 66, and a power factor correction system 80 with a PFC control component 86, where the motor drive may allow selective activation or deactivation of the power factor correction system.

The motor control component 66 receives the motor feedback 58 and one or more desired operating point inputs 72 and implements a motor control strategy or scheme to determine a required motor control current value 66a according to the motor feedback 58 and the setpoint or profile 70. The required motor control current value 66a output by the motor control component 66 at any given time represents the amount of current required to drive the motor 50 to the desired operational setpoint or profile 70 as well as the current required for any output filter components (e.g., output capacitors $C_{O1}$, $C_{O2}$, and $C_{O3}$), and the value 66a may be a set of values associated with the requirements for each motor winding including phase, amplitude, and other associated information by which the rectifier and inverter control components 62 and 64 can ascertain the appropriate switching signals 24 and 44, respectively. The motor controller 66 may implement any suitable closed loop regulation or control scheme which may include outer and inner control loops in generating the output value(s) 66a, for example, to provide regulated speed and/or torque control of the motor operation according to the desired values 58. In one example, torque is controlled as an inner servo control loop with motor speed controlled as an outer loop, where the motor controller 66 also implements control of the motor flux in association with controlling motor torque and speed.

The power factor control component 86 receives the rectifier feedback 28 and determines a required power factor compensation current value 86a corresponding to the input capacitors $C_{I1}$, $C_{I2}$, and $C_{I3}$ representing the current required to adjust the rectifier operation for unity or near-unity power factor. The value 86a may be determined in any suitable manner in accordance with the present disclosure, and may be based at least partially on the rectifier feedback information 28. In one example, the amount of input capacitor current draw is measured and provided in the feedback information 28 along with the firing angle of the rectifier 20 and the angle at which the current would be drawn from the AC input 10. Based on this information, the power factor control component 86 determines how much DC current is needed for power factor compensation and provides this as the output 86a. In another implementation with known capacitor values, the amount of input capacitor current draw could be estimated in determining the required power factor compensation current value 86a. The inventors in this regard have appreciated that the input capacitor current is at a leading angle of 90 degrees, whereas the current drawn by the rectifier 20 typically varies from 0 zero degrees to 90 degrees lagging during motor startup. The power factor correction control component 86 accordingly outputs the value 86a as the additional rectifier current (at the present angle) needed to cancel the capacitor current vector (at a 90 degree leading angle) such that provision of the composite capacitor and rectifier current will be at or near unity power factor (e.g., voltage and current in phase).

The rectifier switch control signals 24 are provided by the rectifier control component 62 that includes suitable hardware, logic, software, firmware, etc. to provide the electrical switching signals 24 that selectively actuate the rectifier switches 22 in a controlled fashion using pulse width modulation to provide an increased DC link current to the link choke 30 over all or a portion of a motor speed range. In the illustrated example, the rectifier control component 62 employs space vector modulation 62a in generating the switch control signals 24 for the rectifier 20, although other PWM approaches can be used in other embodiments. As shown in the example of FIGS. 1 and 3, the rectifier control component 62 receives the required motor control current value 66a from the motor control component 66 and the required power factor compensation current value 86a from the power factor control component 86, along with the rectifier feedback information 28. The rectifier control component 62 then generates the rectifier switch control signals 24 to provide an increased DC link current according to the required current values 66a and 86a and the feedback 28 to control the power factor of the motor drive system 2, in one implementation to a unity or near unity power factor of about 0.95 or more throughout all or a portion of the motor speed range.

The inverter control component 64 in the controller 60 includes suitable components (hardware, firmware, logic, software, etc.) to provide the second set of switch control signals 44 to the inverter 40 to provide the AC motor power output at least partially according to the required motor control current value 66a, where the inverter controller 64 may also receive the required power factor compensation current value 86a from the PFC controller 86. Because the DC link current is increased for power factor compensation purposes, the inverter controller 64 may accommodate the excess DC current in a variety of ways. In one example, the gain of the inverter control 64 is effectively reduced by an amount corresponding to the increase in the DC link current. In the illustrated implementation, the inverter operates according to a space vector modulation scheme 64a (FIG. 3) for low motor speeds, with the controller 64 selectively employing bypass states 64b in the modulation scheme to effectively bypass the appropriate amount of excess DC link current through the inverter 40 itself, where the amount of bypassed link current is determined at least partially according to the required power factor compensation current value 86a from the PFC controller 86. In this embodiment, moreover, the inverter control component 64 employs a segmented control in which space vector modulation is employed for lower motor speeds below a first speed value, for example, about 57% of full speed in one implementation, with bypass states being introduced in the switching patterns via the switch control signals 44 to selectively bypass the extra current through the inverter itself 40 while providing the required motor control current to the motor 50.

For higher motor speeds, the switch control signals 44 are provided by the controller 64 according to a selective harmonic elimination scheme, wherein the inverter controller 64 optionally uses flux control to reduce the motor flux by which additional DC link current can be accommodated by the motor 50 while achieving the desired speed and torque. In this regard, the inventors have appreciated that reducing the motor flux effectively reduces the torque gain of the motor 50 whereby additional current from the DC link can be consumed by the motor 50 for a given torque output thereby balancing the increased current gain of the rectifier 20. In this segmented control implementation, the rectifier 20 can be operated at the enhanced gain to provide power factor compensation throughout the motor speed range with the inverter controller 64 accommodating the resulting excess DC link current with selective introduction of bypass states in the SVM control signals 44 for lower speeds and with (decreased) flux control via the signals 44 in the higher speed range. In other implementations, the rectifier switch control signals 24 provide for increased rectifier gain only for a portion of the motor speed rage, such as the lower speeds to provide for improved power factor and generator stability improvements during motor startup, with the inverter 40 being controlled accordingly to accommodate the excess DC link current using bypass states, flux control, or other suitable technique. In the preferred implementations, the inverter 40 is controlled with a reduced gain or to otherwise accommodate excess DC link current throughout the same speed range for which the rectifier is operated at an increased gain.

Figure 4:
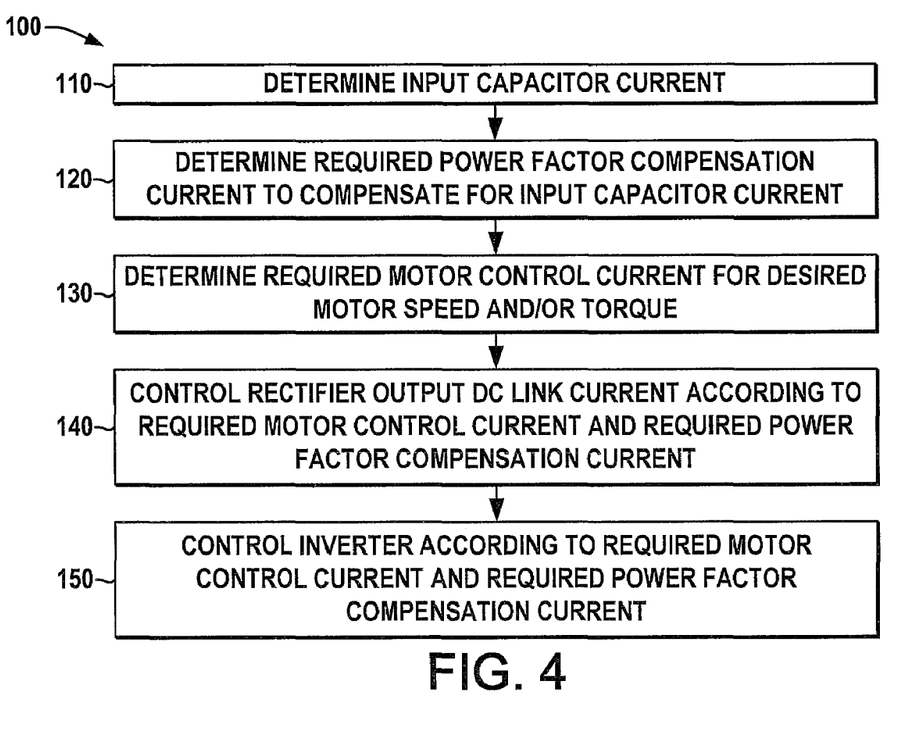
FIG. 4 is a flow diagram illustrating an exemplary AC motor control method in accordance with further aspects of the disclosure.

Referring now to FIG. 4, an exemplary method 100 is illustrated for controlling a motor in accordance with one or more aspects of the present disclosure. Although the exemplary method 100 is depicted and described in the form of a series of acts or events, it will be appreciated that the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated methods may be implemented in hardware, software, or combinations thereof, in order to provide motor drive control functionality with power factor compensation or correction in control systems operating a motor drive environment such as those illustrated and described herein, although the invention is not limited to the specifically illustrated or described applications and systems.

The method 100 begins with determination of the input capacitor current at 110, which may be accomplished in any suitable fashion such as through actual measurement in the filter stage 26 of the rectifier 20 in the exemplary motor drive 2 (FIG. 2 above), or estimation using known capacitor values, etc. At 120, a required power factor correction or compensation current value is determined to compensate for the measured or estimated input capacitor current, which may be determined using any suitable technique. A required motor control current value is determined at 130, for example, using any suitable motor control scheme used in control of motor speed, torque, etc. The rectifier output is controlled at 140 based at least partially on the required motor control and power factor correction current values determined at 120 and 130. The rectifier control at 140 thus provides sufficient DC link current to ensure the necessary current for driving the motor at the desired operating point and additionally switches enough additional current to compensate the motor drive power factor for the current consumed by the input filter capacitors. At 150, the inverter is controlled according to the required motor control current value to drive the motor in accordance with the motor control scheme. The inverter control at 150 may also account for the excess DC link current, wherein the inverter switch control signals may selectively include bypass states to divert the excess current through the inverter itself, and/or may employ flux control to reduce the motor torque gain so as to accommodate all or a portion of the excess DC link current in the motor itself, or combinations of bypass states and flux control or other current accommodation techniques.

Figure 5:
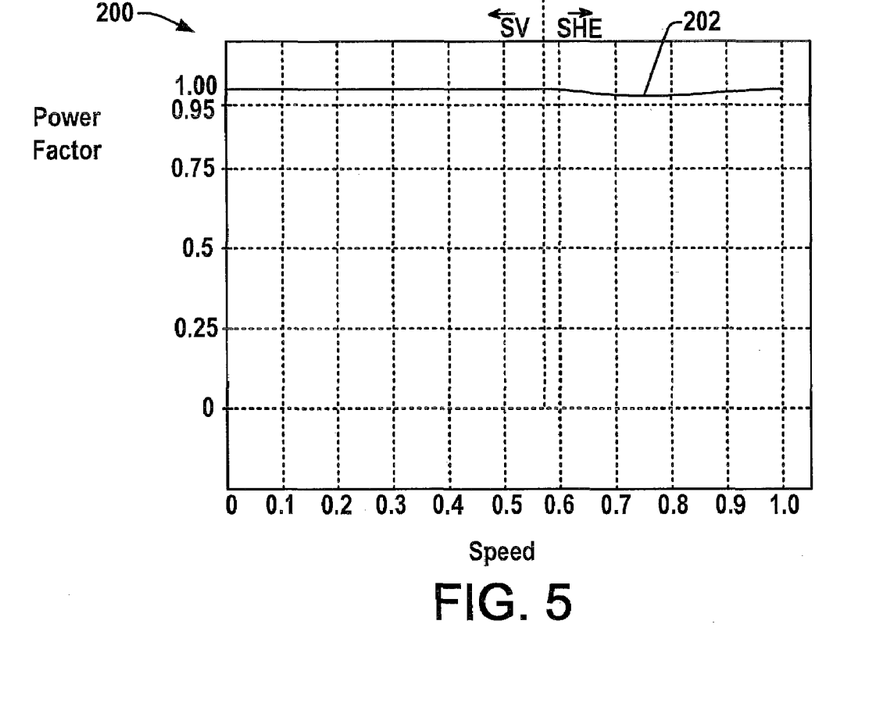
FIG. 5 is a graph showing an exemplary simulated motor power factor curve in the drive of FIGS. 1-3.

Referring now to FIG. 5, exemplary motor drive simulation results are shown in a graph 200 depicting a power factor curve 202 as a function of motor speed in the exemplary motor drive 2. In the simulation example of FIG. 5, the rectifier 20 is operated at increased gain to provide power factor correction as described above at low speeds from zero to about 57% of rated motor speed so as to avoid or mitigate the above described generator instability problems associated with non-unity leading power factor at motor startup or low speed operation. In this first speed range, the exemplary inverter 40 is operated via space vector modulated switch control signals 44 that include bypass states 64b to accommodate the added DC link current. As can be seen in the power factor curve 202, the power factor is unity or near-unity (e.g. well above 0.95 in this example) over the low speed range to about 57% of rated motor speed. In this embodiment, the rectifier reverts to a non-PFC mode (the rectifier gain is not increased but instead controlled only according to the required motor control current value 66a) and no bypass states or flux control modifications are used in controlling the inverter 40 for speeds above 57% of the rated motor speed, wherein the curve 202 include a slight power factor dip for this higher speed range. In other possible embodiments, the rectifier gain can be increased in the high speed range according to the required power factor compensation current value, and the inverter gain can be reduced accordingly in order to address the power factor dip shown in FIG. 5. In this regard, flux control in the inverter 40 is believed to provide a suitable inverter gain increase approach at these higher motor speeds as described above.

Figure 6:
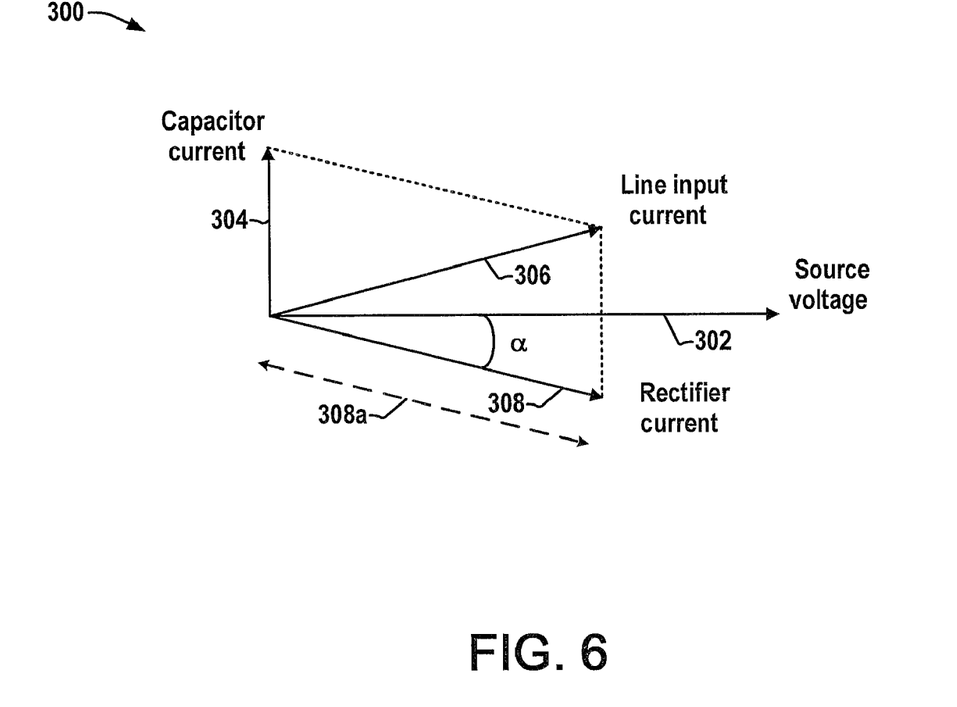
FIG. 6 is a phase diagram illustrating input power factor in the motor drive with no power factor correction.
Figure 7:
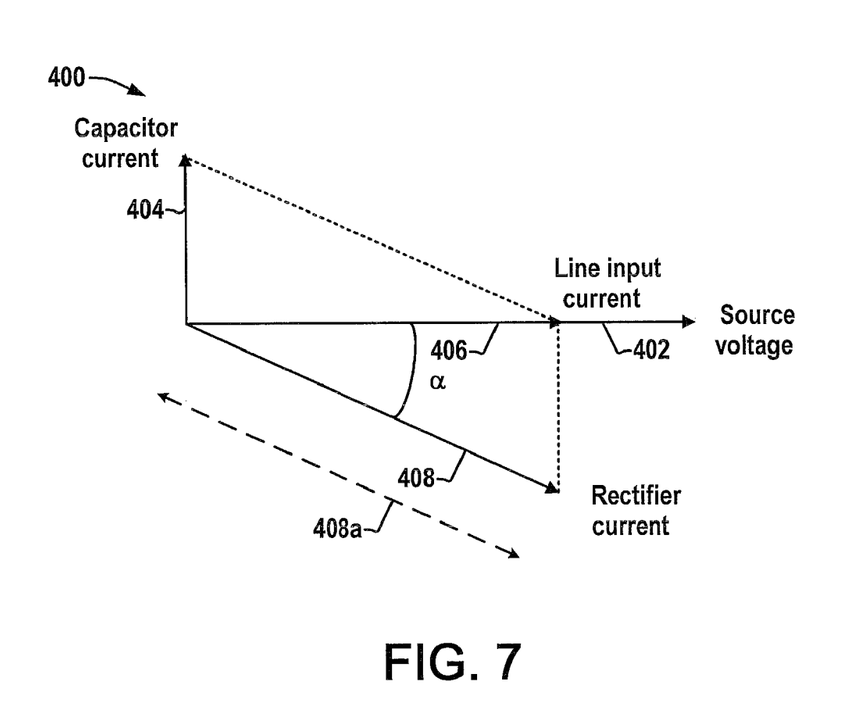
FIG. 7 is a phase diagram illustrating exemplary near unity input power factor using the exemplary control system in the drive of FIGS. 1-3.

Referring now to FIGS. 1, 6, and 7, FIG. 6 shows a phasor diagram 300 illustrating input power factor for a given speed and load condition in the exemplary motor drive 2 with no power factor correction (e.g., with the PFC controller 86 off). In this example, the source voltage is shown as a vector 302, with the capacitor current 304 of a given amplitude leading the voltage 302 at a 90 degree angle. In this exemplary situation, the demanded rectifier current 308 is at a lagging angle a with an amplitude 308a determined based on feedback of the motor conditions and the current speed and torque setpoint values via the speed/torque motor controller 66 according to the signal 66a. The resulting line current drawn 306 from the AC input power source 10 is also illustrated for this case, wherein a non-unity power factor results from the non-zero angle between the source voltage vector 302 and the line input current 306. In accordance with the present disclosure, FIG. 7 provides a phase diagram 400 illustrating exemplary near unity input power factor operation with the PFC controller 86 operative to provide power factor correction for near unity power factor operation of the drive 2 as described supra, with other motor setpoints and operating conditions being the same as in the case of FIG. 6. In this power factor correction mode, the phasor diagram 400 illustrates the source voltage vector 402, with the capacitor current 404 again leading the voltage 402 by 90 degrees. The operation of the PFC controller 86 provides the required power factor compensation current value 86a to the rectifier controller 62 so as to adjust the rectifier current 408 to a different amplitude 408a and angle a such that the line current 406 is substantially in phase with the source voltage 402, thereby achieving unity or near unity power factor operation of the motor drive 2. Moreover, as illustrated and described above, the inverter 40 is controlled so as to accommodate the extra rectifier output current in the DC link, whereby the drive 2 operates at a desired near unity power factor without sacrificing motor control performance.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Having thus described the invention, the following is claimed:

1. A motor drive system, comprising:
a switching rectifier including a first set of switching devices coupled with an AC input and operable according to a first set of switch control signals to selectively couple the AC input with an intermediate DC link to provide a DC link current;
an inverter including a second set of switching devices coupled with the DC link and operable according to a second set of switch control signals to provide an AC output current to a motor; and
a controller operatively coupled with the switching rectifier and with the inverter to provide the first and second sets of switch control signals, the controller comprising:
a motor control component determining a required motor control current value according to motor feedback and a setpoint or profile,
a power factor control component determining a required power factor compensation current value corresponding to input capacitors associated with the AC input,
a rectifier control component operative to provide the first set of switch control signals to the switching rectifier to provide an increased DC link current over at least a portion of a motor speed range according to the required motor control current value and the required power factor compensation current value to control the power factor of the motor drive system, and
an inverter control component operative to provide the second set of switch control signals to the inverter to provide the AC output according to the required motor control current.

2. The motor drive system of claim 1, wherein the inverter control component operates at a reduced gain according to the required power factor compensation current value.

3. The motor drive system of claim 2, wherein the inverter control component provides at least one bypass state in the second set of switch control signals to selectively bypass a portion of the DC link current according to the required power factor compensation current value while providing the AC output current to the motor according to the required motor control current value.

4. The motor drive system of claim 3, wherein the inverter control component provides the second set of switch control signals using space vector modulation.

5. The motor drive system of claim 2, wherein the rectifier control component provides the first set of switch control signals for increased DC link current and the inverter control component operates at a reduced gain at motor speeds below a first speed value, the first speed value being less than full motor speed.

6. The motor drive system of claim 2, wherein the inverter control component provides the second set of switch control signals to selectively reduce motor flux according to the required power factor compensation current value while providing the AC output current to the motor according to the required motor control current value.

7. The motor drive system of claim 6, wherein the inverter control component provides the second set of switch control signals to selectively reduce motor flux at motor speeds above a first speed value, the first speed value being less than full motor speed.

8. The motor drive system of claim 2, wherein the required power factor compensation current value corresponds to an amount of input current needed to correct a drive power factor to compensate for current drawn by input capacitors associated with the AC input, and wherein the rectifier control component is operative to provide the first set of switch control signals to the switching rectifier to provide the increased DC link current at a gain such that the DC link current level exceeds a peak current requirement of the motor and any output filter capacitors.

9. The motor drive system of claim 1, wherein the rectifier control component provides the first set of switch control signals for increased DC link current at motor speeds below a first speed value, the first speed value being less than full motor speed.

10. The motor drive system of claim 1, wherein the rectifier control component controls the switching rectifier to provide a motor drive power factor of about 0.95 or more over the portion of the speed range.

11. A control system for controlling power factor in a motor drive system having a switching rectifier providing a DC link current to an inverter, the control system comprising:
a motor control component determining a required motor control current value according to motor feedback and a setpoint or profile;
a power factor control component determining a required power factor compensation current value corresponding to input capacitors associated with an AC input of the rectifier;
a rectifier control component operative to provide a first set of switch control signals to the switching rectifier to provide an increased DC link current over at least a portion of a motor speed range according to the required motor control current value and the required power factor compensation current value to control the power factor of the motor drive system; and
an inverter control component operative to provide the second set of switch control signals to the inverter to provide the AC output according to the required motor control current.

12. The control system of claim 11, wherein the inverter control component operates at a reduced gain according to the required power factor compensation current value.

13. The control system of claim 12, wherein the inverter control component provides at least one bypass state in the second set of switch control signals to selectively bypass a portion of the DC link current according to the required power factor compensation current value while providing the AC output current to the motor according to the required motor control current value.

14. The control system of claim 12, wherein the rectifier control component provides the first set of switch control signals for increased DC link current and the inverter control component operates at a reduced gain at motor speeds below a first speed value, the first speed value being less than full motor speed.

15. The control system of claim 12, wherein the inverter control component provides the second set of switch control signals to selectively reduce motor flux according to the required power factor compensation current value while providing the AC output current to the motor according to the required motor control current value.

16. The control system of claim 15, wherein the inverter control component provides the second set of switch control signals to selectively reduce motor flux at motor speeds above a first speed value, the first speed value being less than full motor speed.

17. The control system of claim 11, wherein the rectifier control component provides the first set of switch control signals for increased DC link current at motor speeds below a first speed value, the first speed value being less than full motor speed.

18. A method for controlling an AC motor, comprising:
rectifying an AC input to provide a DC link current using a switching rectifier;
inverting the DC link current to provide an AC output current to a motor using an inverter;
determining a required motor control current value according to motor feedback and a setpoint or profile;
determining a required power factor compensation current value corresponding to input capacitors associated with the AC input;
controlling the switching rectifier to provide an increased DC link current over at least a portion of a motor speed range according to the required motor control current value and the required power factor compensation current value; and
controlling the inverter to provide the AC output according to the required motor control current.

19. The method of claim 18, wherein controlling the switching rectifier comprises increasing a rectifier gain according to the required power factor compensation current value to provide a motor drive power factor of about 0.95 or more.

20. The method of claim 18, wherein controlling the inverter comprises reducing an inverter gain according to the required power factor compensation current value.

21. The method of claim 20, wherein controlling the inverter comprises providing switch control signals with at least one bypass state to the inverter to selectively bypass a portion of the DC link current according to the required power factor compensation current value while providing the AC output current to the motor according to the required motor control current value.

22. The method of claim 20, wherein controlling the inverter comprises selectively reducing motor flux according to the required power factor compensation current value while providing the AC output current to the motor according to the required motor control current value.

* * * * *